United States Patent
Kirstein et al.

(10) Patent No.: US 7,121,130 B2
(45) Date of Patent: Oct. 17, 2006

(54) METHOD AND INSTALLATION FOR HOT-ROLLING STRIPS USING A STECKEL ROLLING FRAME

(75) Inventors: Hartmut Kirstein, Solingen (DE); Heiko Reichel, Bad Berleburg (DE)

(73) Assignee: SMS Demag AG, Düsseldorf (DE)

( * ) Notice: Subject to any disclaimer, the term of this patent is extended or adjusted under 35 U.S.C. 154(b) by 0 days.

(21) Appl. No.: 10/537,018

(22) PCT Filed: Dec. 10, 2003

(86) PCT No.: PCT/EP03/14001

§ 371 (c)(1),
(2), (4) Date: Jun. 1, 2005

(87) PCT Pub. No.: WO2004/054730

PCT Pub. Date: Jul. 1, 2004

(65) Prior Publication Data

US 2005/0285316 A1    Dec. 29, 2005

(30) Foreign Application Priority Data

Dec. 14, 2002   (DE) ............................... 102 58 498
Dec. 5, 2003    (DE) ............................... 103 57 272

(51) Int. Cl.
    B21B 1/34    (2006.01)
(52) U.S. Cl. .................. 72/203; 72/148; 72/202; 83/305; 83/157; 83/341; 83/345

(58) Field of Classification Search ............... 72/202, 72/203, 148, 200, 221; 83/303, 345, 670, 83/119, 120, 157, 165
See application file for complete search history.

(56) References Cited

U.S. PATENT DOCUMENTS

| | | | | |
|---|---|---|---|---|
| 1,977,214 | A | * | 10/1934 | Steckel ........................ 72/40 |
| 3,322,012 | A | * | 5/1967 | Murray ....................... 83/341 |
| 4,494,395 | A | * | 1/1985 | Brettbacher et al. .......... 72/203 |
| 4,497,191 | A | * | 2/1985 | Langer et al. ................ 72/202 |
| 4,675,974 | A | * | 6/1987 | Connolly .................. 29/527.7 |
| 5,079,941 | A | * | 1/1992 | De Blok et al. ............. 72/203 |
| 5,285,670 | A | * | 2/1994 | Thomas ...................... 72/146 |
| 2002/0035906 | A1 | * | 3/2002 | Rosenthal et al. ............. 83/13 |
| 2002/0184984 | A1 | * | 12/2002 | Rosenthal et al. ........... 83/305 |

FOREIGN PATENT DOCUMENTS

| EP | 0 088 201 | 9/1983 |
|---|---|---|
| EP | 0 593 398 | 4/1994 |
| EP | 0 829 322 | 3/1998 |

* cited by examiner

Primary Examiner—Dmitry Suhol
(74) Attorney, Agent, or Firm—Friedrich Kueffner

(57) ABSTRACT

The invention relates to a method and an installation for hot-rolling strips using a reversible Steckel rolling frame (8), each side of which is equipped with a respective furnace coiler (9, 10) and a driving mechanism (17,18), provided between the furnace coiler (9, 10) and Steckel rolling frame (8). The aim of the invention is to crop particularly thin, hot strips. To achieve this, the strip is cropped during the reversible rolling process by a single pair of flying cropping shears (20), positioned between one of the driving mechanisms (17) and the Steckel rolling frame (8). The cropping shears comprise in particular a drum blade.

7 Claims, 10 Drawing Sheets

METHOD AND INSTALLATION FOR HOT-ROLLING STRIPS USING A STECKEL ROLLING FRAME

The invention concerns a method and an installation for hot rolling strip, especially steel strip, in which the rolling stock is rolled in a reversing Steckel rolling stand and is conveyed by drivers between two furnace reels, which are arranged on either side of the Steckel rolling stand in the direction of conveyance. The drivers are arranged between the corresponding furnace reel and the Steckel rolling stand.

An installation with a Steckel rolling stand is described, for example, in DE 195 49 208 A1. In accordance with the prior art, the rolling stock is rolled in at least one reversing roughing stand in a number of breakdown passes to produce a prestrip, which is then conveyed to a Steckel finishing stand via an intermediate roller table. In the Steckel finishing stand, the strip is finish-rolled in a number of passes to produce finished strip of a predetermined gage. The strip is then cooled, possibly by forced cooling, coiled in a finished-strip coiler, and removed for further processing.

A cropping shear, which is assigned to the breakdown train, is installed between the roughing stand or the roller table and the finishing stand. The irregular trailing and leading ends of the prestrip that were formed during the breakdown rolling are separated by this cropping shear. The strip, which has been cropped immediately after the breakdown train, is then further reduced in the Steckel rolling stand.

This rolling process again results in the formation of irregular strip ends or slivers, which interfere with threading in the coiling process in the furnace reel. Especially in the case of strips that have been rolled very thin, so that severe, unfavorable strip sliver formation has occurred, these irregular strip ends have a negative effect on the coiling process. With conventional Steckel rolling stands, correction of the strip ends during the rolling operation is not possible in the area of the finishing stand.

EP 0 088 201 B1 describes a reversing rolling mill with two reels, in which a cropping shear is installed after a second finishing stand and the reversing reel. The cropping shear comprises an upper and a lower cutter block, which are driven at a peripheral speed that is adjusted to the running speed of the rolling stock, so that the blades are moved together with the rolling stock during the cutting. A support roller for the hot strip is rotatably supported on the lower cutter block, so that in the area of the cropping shear, guidance for the hot strip is equivalent to the guidance on the roller table. If the cutter blocks are driven for a cropping operation, the support roller is rotated down and away from the vicinity of the hot strip by rotation of the cutter block about its axis in order to make room for the blade action. After a full rotation of the cutter block, the support roller arrives back in its operating position. The functions of cutting and supporting are thus obtained by rotation of the cutter block about the cutter block axis. The reversing reels are not furnace reels.

EP 0 593 398 A1 describes a Steckel rolling stand for hot rolling, in which a unit comprising a driver and a cropping shear is arranged between two reel furnaces and a rolling stand. The cropping shear comprises nonrotating upper and lower shear blades. The shear can cut off (crop) the ends of the strip only when the rolling stock is stationary. The necessary stoppage time has an unfavorable effect on the strip temperature that is necessary to produce thin strip gages.

Proceeding on the basis of this prior art, the objective of the invention is to develop a method and an installation of this general type with which especially thin, hot strip can be cropped without any problems and without loss of time.

This objective is achieved by the method according to Claim 1 and the installation according to Claim 3. Advantageous modifications are described in the dependent claims.

The central idea of the invention is that the strip is cropped during the reversing rolling in the Steckel rolling stand by means of a single flying cropping shear installed between a driver and the Steckel rolling stand. The flying corrective cropping is made possible in the vicinity of a Steckel rolling mill with only a single shear. This has the advantage that the irregular strip ends or slivers that form especially in the case of thin strip gages can be removed within the rolling process, so that the coiling process in the furnace reels or during the final coiling is not disturbed.

Since the cropping shear is integrated in the reversing process of the Steckel rolling, a single shear can be used for cropping in both strip running directions. In particular, if final strip gages of less than about 2 mm are being rolled, the given end of the strip that is entering the furnace reel or that is running in the direction of this furnace reel and the driver located in front of it is cropped by the integrated cropping shear, so that the process can run smoothly and without disruptions in the furnace reel.

The cropping shear itself is a flying shear, so that cropping can be performed during rolling with the rolling speed largely maintained. Due to the flying cutting, there is almost no loss of time during cutting, so that the strip undergoes very little cooling, i.e., favorable strip temperatures are maintained.

Since the proposed cropping shear is used in the vicinity of the Steckel rolling stand and thus is used to cut strip that is already relatively thin, one shear of a small size compared to the previously known shear in the breakdown rolling train is sufficient. Since the disturbing strip ends form only after several reversing passes in the Steckel finishing stand, the shear can be designed for cutting small strip thicknesses, i.e., it can be designed for relatively light-duty work.

In addition to a process sequence of the type described in DE 195 49 208 A1, an installation with a Steckel rolling stand and integrated cropping shear between a furnace reel and the rolls of the driver can also be used in other, alternative process sequences, e.g., of the types described in DE 40 09 860 C2. The process sequence described there comprises a CSP (compact strip production) continuous casting plant with a downstream soaking furnace, in which strip-like feed material in prestrip lengths is subjected to temperature homogenization or heating to rolling temperature. A shear and a rolling mill are arranged downstream of the soaking furnace in the direction of strip conveyance. The rolling mill consists of a reversing Steckel stand or a tandem finishing train. The aforementioned shear in this process sequence serves to break up nonrollable material and does not operate as a cropping shear.

The use of a Steckel rolling stand as a finishing mill in this process sequence is advantageous due to the low capital costs, and especially in this case, the flying cropping shear in the vicinity of the Steckel rolling stand offers a good possibility for correcting the irregular strip ends that arise during the rolling process and for avoiding disturbances of the coiling process in the furnace reels.

In accordance with an especially preferred modification, the cropping shear, which is installed between one of the drivers and the Steckel rolling stand, is designed as a drum blade cropping shear with both an upper and a lower adjustable blade drum for the flying cutting of the strip material, such that each blade drum and especially both blade drums can be adjusted between a position some distance from the passing strip material during the rolling operation and a cutting position.

A shear of this type is installed in the process path between the Steckel rolling stand and a furnace reel or coiling furnace. Both blade drums are located during the rolling operation in a retracted position with a good distance between the blade drum and the strip and are brought into the cutting position only to make a cut. In this way, the blade drums are not arranged so close to the hot strip when they are in the rolling position. Therefore, the thermal stress on the blade drums is significantly reduced.

Due to the large distance of the blade drum from the strip, defective strips, for example, strips with a turn-up or turn-down or with waviness, can pass unhindered through the shear. Damage to the upper side or underside of the strip by contact with the blade drums is effectively prevented.

In addition, in accordance with a preferred embodiment, due to the distance of the blade drums from the strip, they can continuously rotate, so that the thermal stress is uniformly distributed over the circumference of the drum.

Even if the blade drums do not continuously rotate, before the cut is made, they are set in motion at the proper time and synchronized with the strip running speed. The shear drive power can be kept low in this way. It is not necessary to accelerate the blade drums to the strip running speed within a small angle of rotation (which is usually 180–270°), which is associated with high motor power.

In accordance with a preferred embodiment, heat shields are swung into the space between the adjustable blade drums and the strip during the rolling operation. This measure further reduces the thermal stress on the blade drums.

It is advantageous for the lower heat shield to be equipped with one or more support rollers, so that the strip receives rolling support as it passes through during the rolling operation. Each support roller on the lower heat shield has a stable construction and is preferably driven, so that the underside of the supported strip is not damaged as is passes through. This support roller can be externally driven, i.e., from outside the shear housing, by a universal-joint shaft. The heat shields, which are subject to high wear due to the high heat load between the blade drums, are preferably designed to be easily replaceable. They are replaced, for example, as part of a blade change.

In accordance with a modification of the installation, the blade drums are cooled from the outside with a coolant, such as water. In this case, the upper heat shield serves as a water collection channel, so that the cooling water for the upper blade drum does not come into contact with the strip and unnecessarily lower the strip temperature. Permanent cooling of the blade drums during the passage of the strip through the shear is possible.

Each swiveling heat shield is preferably supported on the axis of the corresponding blade drum. Since the heat shields are not subject to excessive mechanical loads, large bearings of low load-bearing capacity are sufficient for adaptation to the journal diameter of the blade drums.

In addition to the bearing of the heat shields on the blade drum journals, it is also possible to mount them rotatably on the shear frame or the extended guide levers for the blade drums.

The claimed adjustment of the blade drums is preferably accomplished by an upper and a lower toggle mechanism, which, in accordance with a modification, are combined in a closed shear frame. The shear frame absorbs the cutting force and at the same time serves as the stop for the coupling of the blade drums in guide levers.

In its extended position, the toggle mechanism guarantees a dimensionally stable, precise position of the blade drums for the cut. Relatively small forces are needed for the adjustment, because only the blade drums have to be moved. The cutting force arises only in the end position of the toggle link. The end position is reached shortly before the shear blades make contact with the strip material.

The swinging away of the heat shields before the cut is made can be accomplished by the toggle drive itself and is thus automatic. It is also possible to use separate hydraulic cylinders, which allow more accurately controlled actuation with respect to time. Furthermore, hydraulic actuation offers the advantage of swiveling the heat shields to both sides, so that a feed funnel always faces the entering end of the strip.

In addition, the installation is modified by a special roller table, which consists of two swiveling roller tables or units, which are arranged at the inlet and outlet of the shear for conveying the strip. Depending on the strip running direction, the roller table unit located after the blade drums is swung upward in such a way that the cut crop end can fall freely and can be removed without any problems. As soon as this has been accomplished, the roller table unit is swung further in the same swiveling direction, until it again reaches its horizontal position. When this swiveling operation has been completed, the next cropped strip end can be caught and carried away.

It is advisable for the rollers of the swiveling roller table units to be independently driven to avoid damage of the underside of the strip. The roller drive can be initiated by means of the swivel bearing of each unit. The distribution of the drive can be accomplished by chain drives or spur gears with intermediate gears. A hydraulic motor or an electric motor with intermediate gears can be used for the swivel drive of the roller table or roller table units.

As a variant for the swiveling roller tables, it is also possible to use stiffened, rotating guide plates with the same function with respect to the removal of crop ends or the collection of the cropped ends of the strip.

The invention has the advantage that the irregular strip ends or slivers that form at both the leading end and the trailing end of a strip, especially in the case of thin strip gages, can be removed within the rolling process, and the coiling process in the furnace reels or during the final coiling is not disturbed. The irregular strip ends (leading end, trailing end of strip) can be corrected during the rolling operation by crop cuts by means of the flying cropping shear in such a way that the strip ends satisfactorily thread into the typical furnace reels for the Steckel rolling process, especially into the receiving slot of the reel drums.

The invention includes the use of multiple-stand Steckel rolling stands.

Additional details, features and advantages of the invention are apparent from the following explanation of the specific embodiment illustrated in the drawings.

Figure 2:
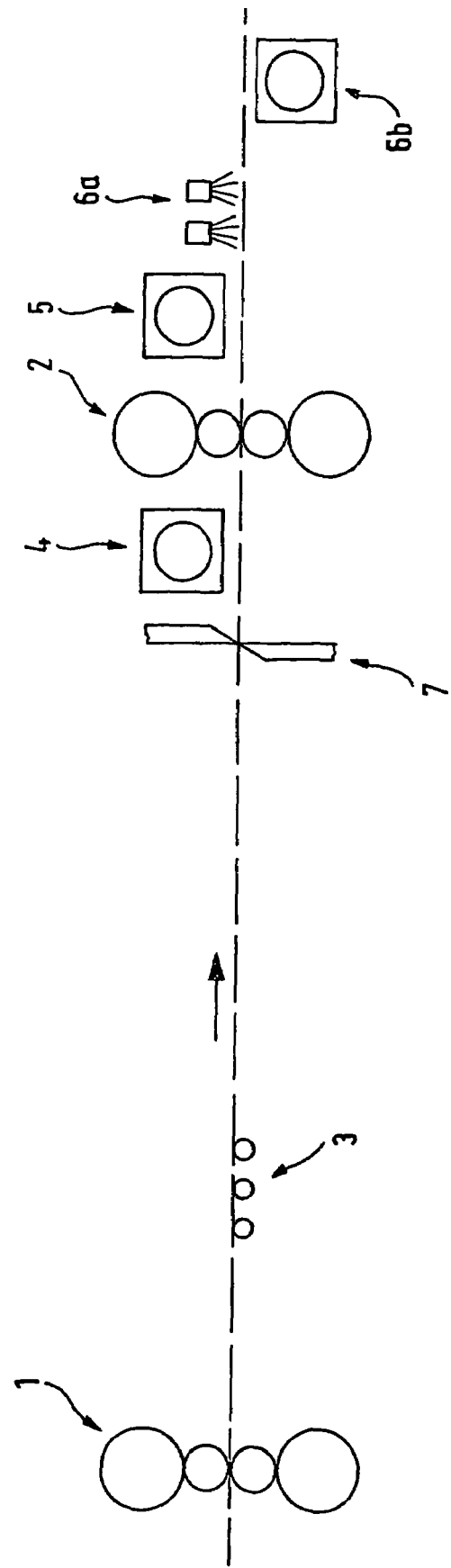
FIG. 2 shows a schematic drawing of a conventional installation with a roughing stand that is followed by a cropping shear and a Steckel rolling stand.

The conventional installation for hot rolling strip that is shown in FIG. 2 comprises at least one reversing roughing stand 1 for the breakdown rolling of a prestrip and at least one Steckel finishing stand 2 for reducing the prestrip to the finished strip. The two parts (1, 2) of the installation are joined by an intermediate roller table 3. The Steckel finishing stand 2, which is a four-high reversing stand in the illustrated case, comprises two reel furnaces 4, 5, in which the strip is coiled and at the same time maintained at rolling temperature. After the finishing rolling has been completed, the strip passes through a final unit 6, which in the present case consists of a cooling line 6a, for example, a laminar cooling line, and another coiler 6b. The strip is wound into a coil, so that it can be conveyed for further processing, for example, in a cold-rolling mill or a coating station, or for shipment out of the plant. A cropping shear 7 for cropping the prestrip is installed in front of the Steckel finishing stand 2 with respect to the direction of strip conveyance (arrow). The cropping shear 7 is designed according to the gage of the prestrip, which can be on the order of 30 mm, and is of a suitable size for the required cutting effect on the strip.

Figure 1:
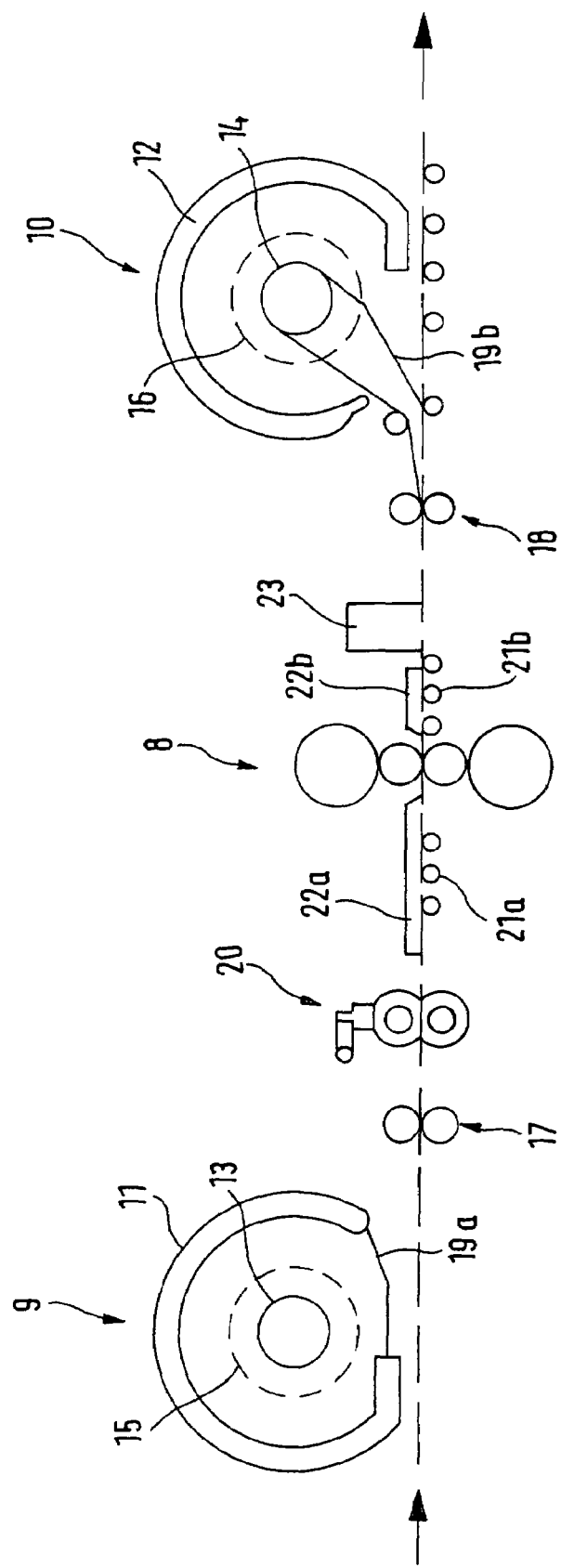
FIG. 1 shows a schematic drawing of a Steckel rolling stand with a cropping shear between a driver and the Steckel rolling stand.

FIG. 1 shows a single-stand Steckel rolling stand 8, which can be integrated in a process sequence of the type shown in FIG. 2 or can be integrated in a different type of process sequence. The Steckel rolling stand 8 in this case is also a four-high reversing stand. The invention also includes the use of multiple-stand Steckel rolling mills. In the direction of production progress (see arrow direction) one furnace reel 9, 10 each is installed before and after the reversing Steckel stand 8. A furnace reel 9, 10 comprises a furnace with a furnace shell 11, 12 and a coiler 13, 14 for winding the rolled strip onto the coil and unwinding it from the coil. The broken line 15, 16 indicates the circumference of a wound coil. Two drivers 17, 18, each with two driving rolls, are arranged on either side of the Steckel stand 8 between each furnace reel 9, 10 and the Steckel stand 8, i.e., one driver each is installed on the feed side and the delivery side of the finishing stand. The furnace reel that is unwinding or inactive is closed, and the furnace reel that is winding is opened by the furnace guide 19a, 19b arranged on the furnace reel 9, 10, respectively. A single cropping shear 20, which is designed small compared to previous prestrip cropping shears (see 7 in FIG. 2), is installed on the feed side of the Steckel rolling mill 8 between one of the drivers (in the present case, for example, driver 17) and the Steckel rolling stand 8. The crop ends can be removed by a suitable collecting device.

This shear crops the front and rear ends of the strip during the rolling process, i.e., without any significant idle times of the hot strip and thus without the strip temperature losses associated with idle time, which interfere with the achievement of thin strip thicknesses of about 2 mm or less.

The use of the shear 20 is described below with reference to the other drawings, which show a drum blade cropping shear and will be explained more explicitly later. The strip runs, for example, after several rolling passes, out of the reversing Steckel stand 8 in the direction of the furnace reel 9. The development or shape of the strip end (sliver) makes a cropping cut necessary in order to carry out the threading and coiling process in the furnace reel without any trouble. For this purpose, the cropping shear is activated, i.e., the blade drums 28a, b (FIGS. 3–6), are brought together, and their speed of rotation is adjusted to the given strip rolling speed.

Figure 9:
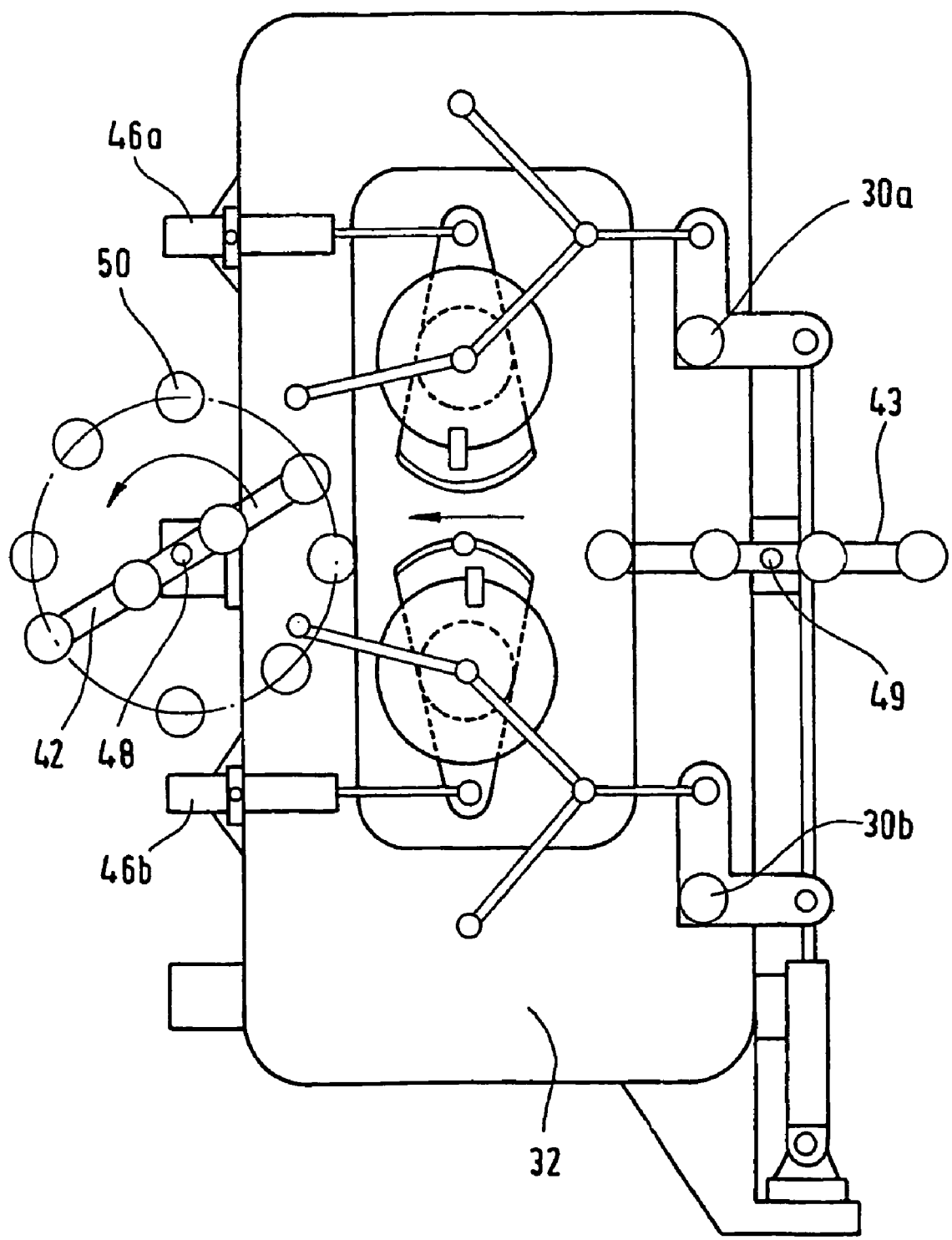
FIG. 9 shows a cropping shear with the swiveled swiveling roller table on the left side.

The device for removing the crop ends, in this case, the swiveling roller table (FIG. 9) 42, is adjusted. The closed-loop control system for the strip flow and the shape of the strip end brings together the blade position of the rotating blade drums and the intended cutting point on the strip end. The cropping cut is then made. The blade drums 28a, b (FIGS. 3–6) are then moved apart again, and the cropped strip is guided to the driver 17 and, without stopping, into the furnace reel 9 by means of the completely swiveled roller table 42 (FIG. 9). In the furnace reel 9, the rolled strip is wound until the trailing end of the strip has nearly reached the position of the driver.

The rolled strip briefly comes to a stop and is ready for the following rolling pass in the opposite, i.e., the reverse, direction.

At this time, the blade drums 28a, b (FIGS. 3–6) of the shear 20 have already been brought together again and are rotating in the opposite direction from before. The swiveling roller table 43 (FIG. 10) is adjusted. Once again, the blade drum rotation and the blade position are synchronized with the cutting point at the end of the strip under the control of the closed-loop control system for the strip flow and the shape of the strip end. The cropping cut at the strip end is made, and the crop end is removed. The cropped strip is conveyed by the roller table 43 (FIG. 10) in the direction of the Steckel reversing stand, in which it is further rolled.

To make the conveyance of the strip on the stand roller table 21a, 21b in the vicinity of the Steckel rolling stand 8 more uniform, lateral guides 22a, b are provided, which are not limited to the extent shown in the drawing. On the side opposite the cropping shear 20, a strip measuring device 23 is installed between the Steckel rolling stand 8 and the second driver 18. This device 23 can be integrated in a closed-loop control system for automatically controlling the Steckel rolling stand 8 and the roll gap. In addition, the values acquired by this device 23 provide information about the state of the head of the strip and the strip end, which can be incorporated in the automatic control of the cropping shear 20 in order, for example, to activate the flying cropping shear according to the necessary crop lengths.

Each of FIGS. 3 to 6 shows a drum blade cropping shear 20 with upper and lower blade drums 28a, b, which can be adjusted by means of an upper and lower toggle mechanism 24a, b, 25a, b, 26a, b and 27a, b, respectively. FIGS. 3 to 6 shows four different embodiments of drives 29a–d of the toggle mechanisms for adjusting the blade drums 28a, b. However, the invention is not limited to these four embodiments. A common feature of all four embodiments is that the toggle mechanisms are driven from one side of the shear or, in the case of the embodiment shown in FIG. 6, from the top and bottom. The driving torque is transmitted to the toggle mechanism on the other side of the shear or the other side of the blade drum by a suitably dimensioned synchronous shaft 30a, b. It should be noted that the drawings show only the principle of the different variants of the shear. The mechanical advantages and the necessary angular position changes resulting from them are not shown correctly.

Figure 3:
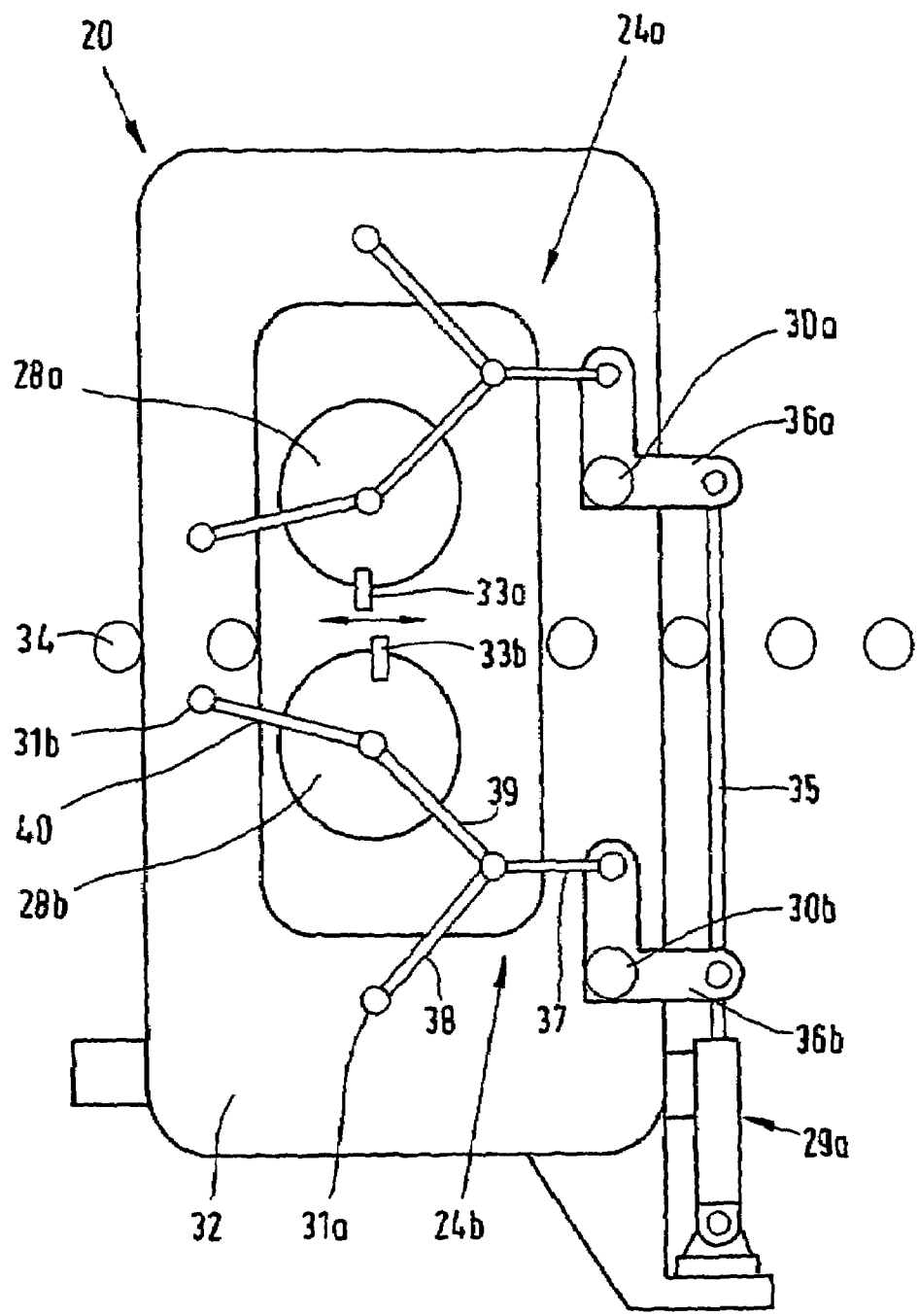
FIG. 3 shows a schematic representation of a drum blade cropping shear with adjustable upper and lower blade drums with a first embodiment of a toggle drive.

In particular, FIG. 3 shows a shear frame 32 with an upper and lower blade drum 28a, b with an upper and lower blade 33a, b mounted on them. The strip is guided between the blade drums 28a, b by a roller table 34. The driving torque of the respective toggle mechanisms 24a, b, which is produced by a hydraulically operated connecting rod 35, is transmitted to the other side of the shear by an upper and lower synchronous shaft 30a, b. The toggle mechanisms 24a, b consist of toggle links 36a, b connected with the synchronous shafts 30a, b, connecting rods 37, additional levers 38–39 and guide levers 40.

Figure 4:
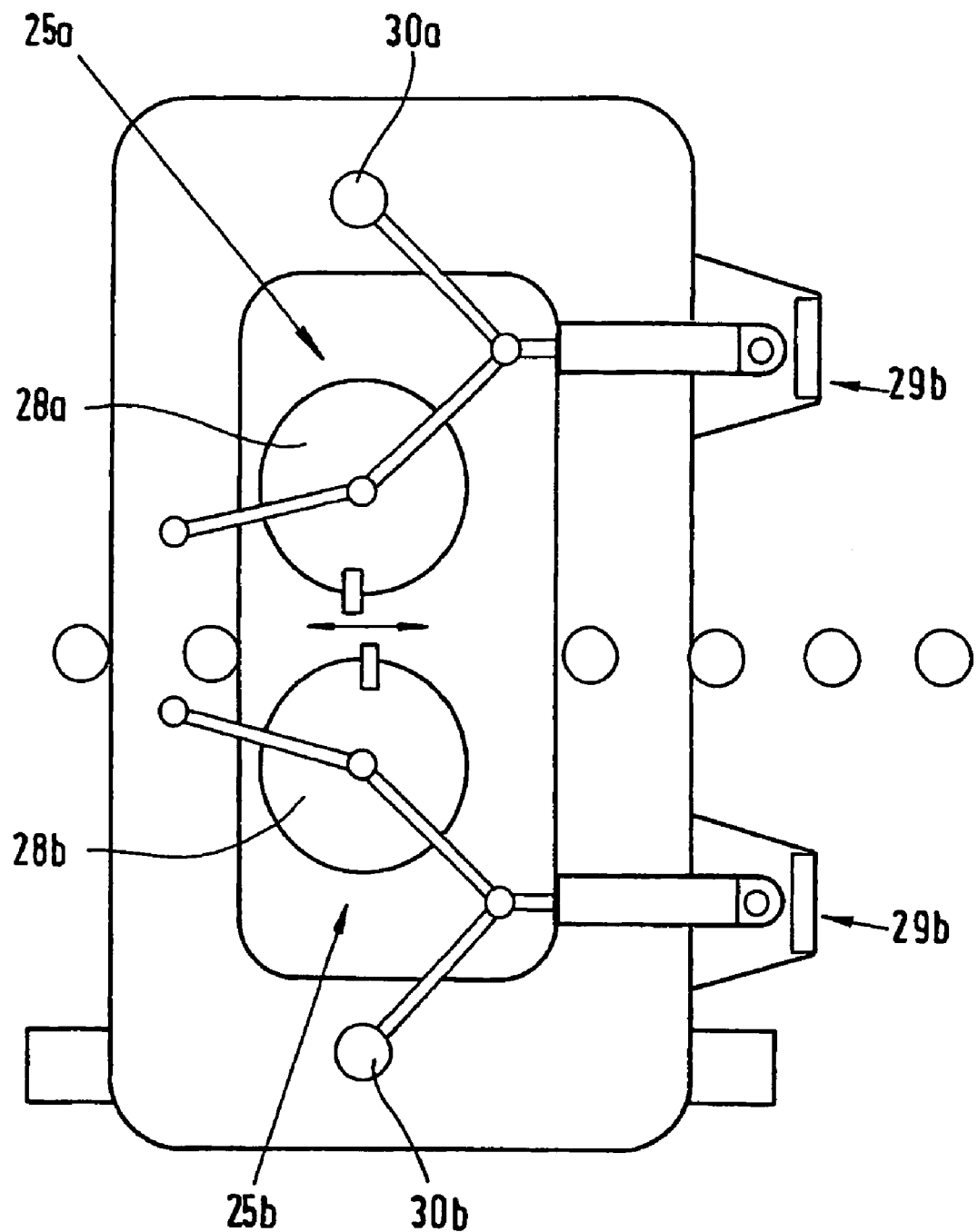
FIG. 4 shows a cropping shear in accordance with FIG. 3 with a second embodiment of the toggle drive.
Figure 5:
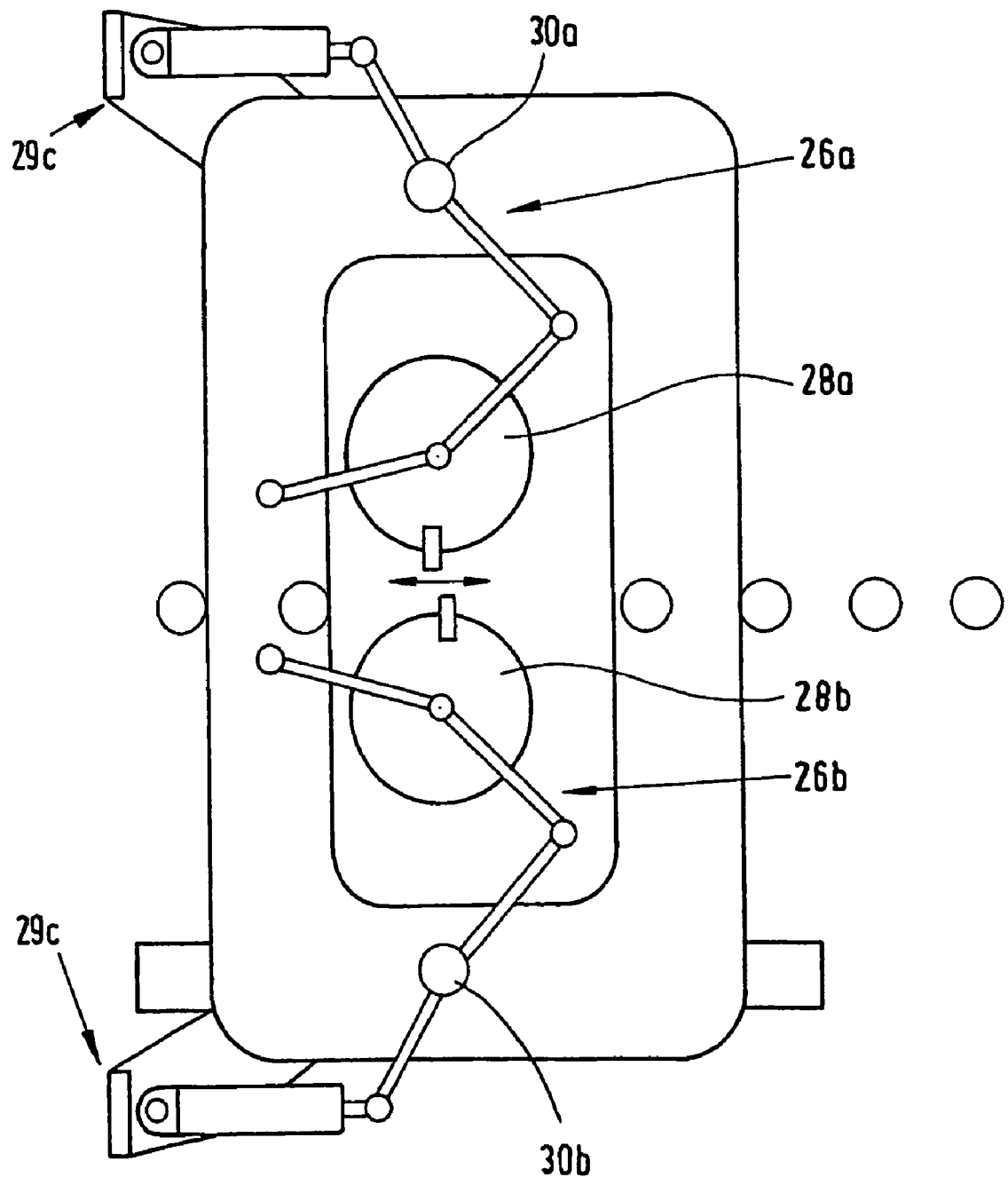
FIG. 5 shows a cropping shear in accordance with FIG. 3 with a third embodiment of the toggle drive.
Figure 6:
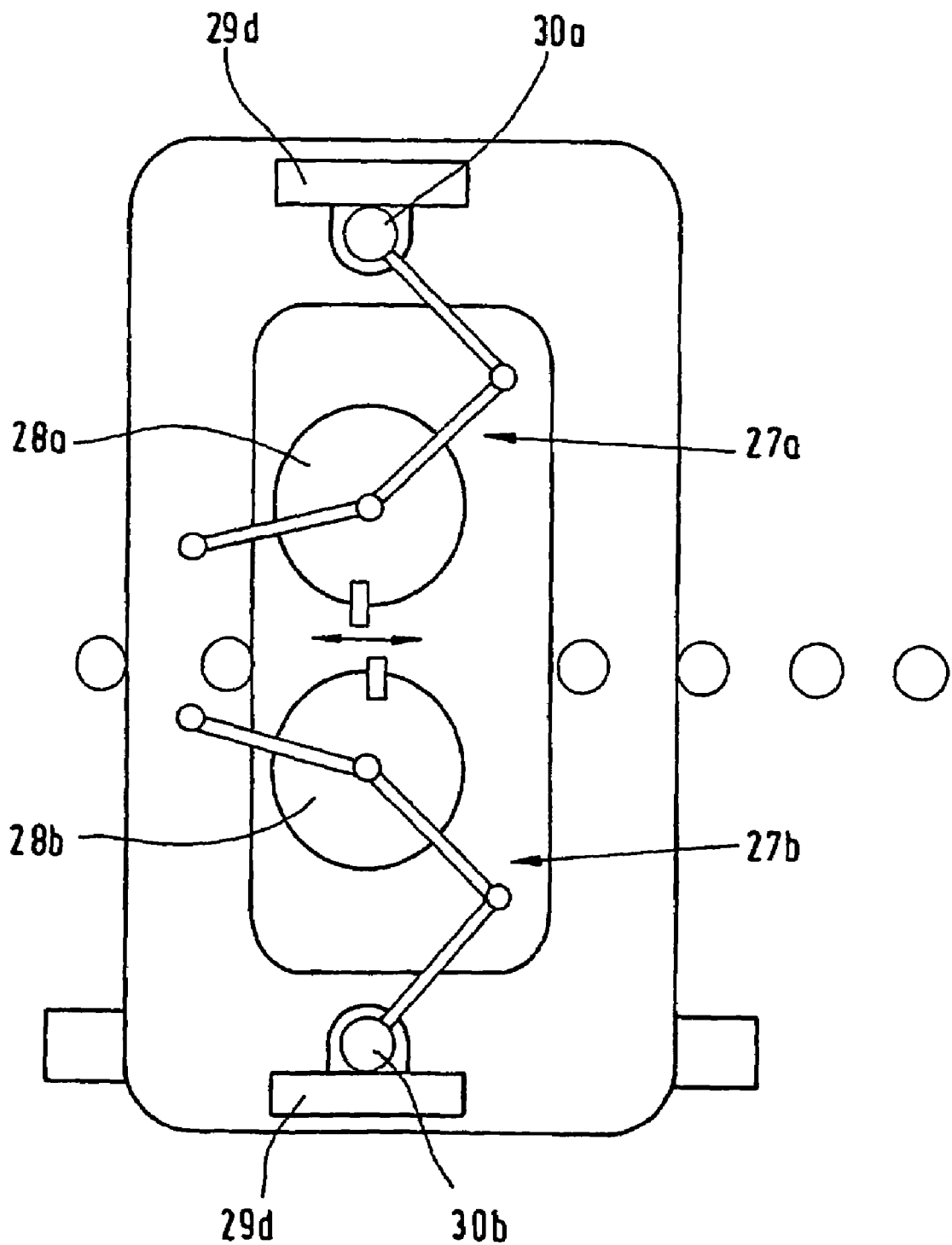
FIG. 6 shows a cropping shear in accordance with FIG. 3 with a fourth embodiment of the toggle drive.
Figure 7:
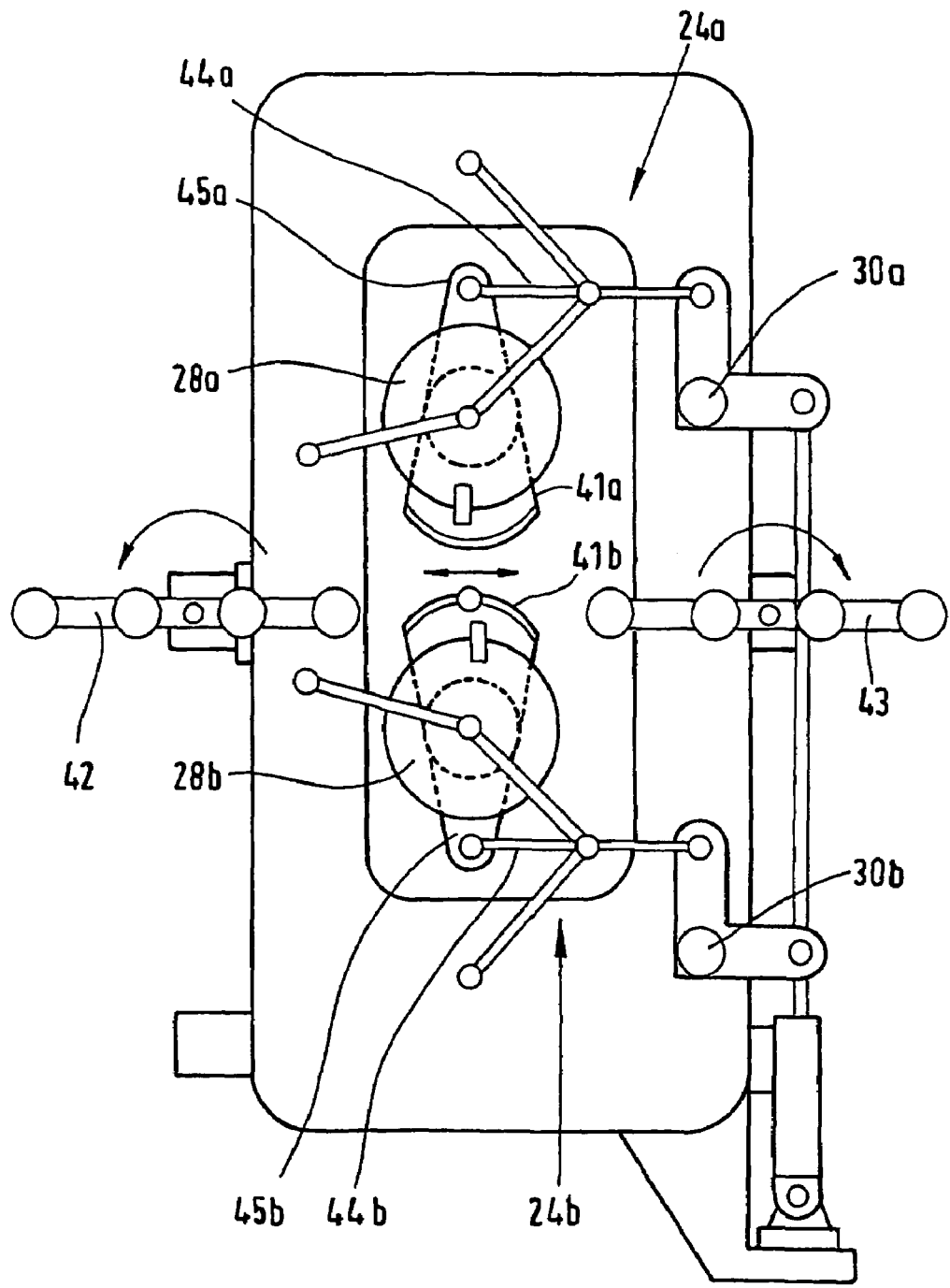
FIG. 7 shows a cropping shear with the blade drum heat shields driven by the toggle mechanism.

In contrast to this, the drives 29b, c and d shown in FIGS. 4, 5 and 6 have two noninteracting drive units. In the embodiment shown in FIG. 6, the drive is realized by two hydraulic swivel drives (29d), each of which acts on a synchronous shaft 30a, b between the two sides of the shear and effects the adjustment of the upper and lower blade drums 28a, b by the toggle links.

FIGS. 7 to 10 show the design of the cropping shear with heat shields 41a, b and their swivel drive and the arrangement and function of a novel roller table (42, 43).

The heat shields 41a, b are supported on the axis of the blade drums 28a, b and are shown in the drawings in the position in which they are swung in, i.e., in their position during the rolling operation. In the embodiment shown in FIG. 7, a lever 44a, b of the toggle mechanism 24a [sic—24a, b] engages the end 45a, b of the heat shield 41a, b that is directed away from the strip, so that the heat shield 41a, b is swiveled by the drive of the toggle mechanism 24a, b.

Figure 8:
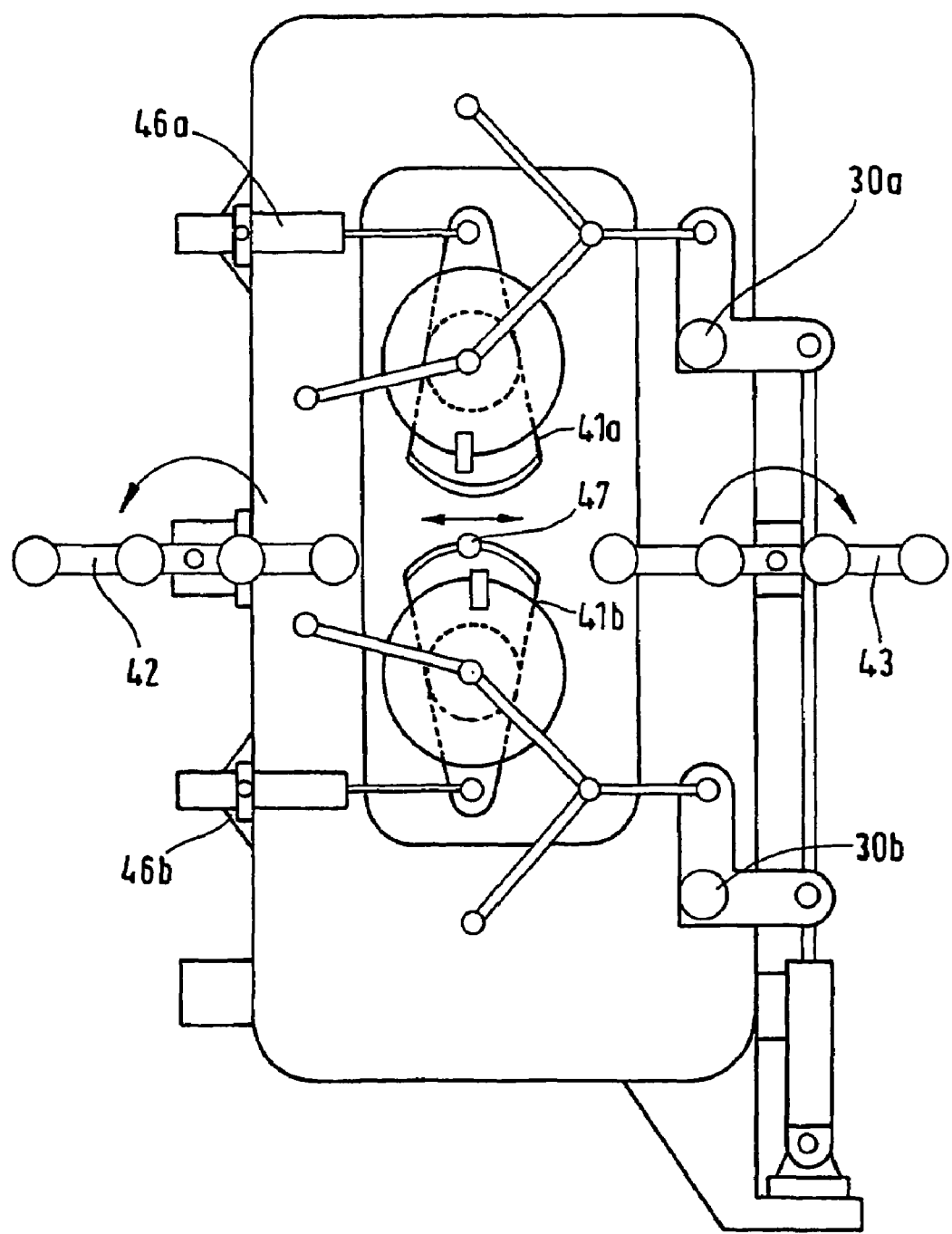
FIG. 8 shows a cropping shear with a hydraulic swivel drive for the heat shields.

In the embodiment shown in FIG. 8, these drives are uncoupled. Two separate drive units 46a, b in the form of hydraulic cylinders are provided for swiveling the heat shields 41a, b. In contrast to the situation with the toggle mechanism 24a, b, the heat shield 41a, b can be swiveled both left and right by the piston rod of the separate drive systems 46a, b to assist the threading of the strip.

To reduce harmful thermal stress of the blade drums 28a, b, they are cooled from the outside with water. The cooling water is collected by the curved, shape of the upper heat shield 41a, which is concave upward, i.e., towards the axis of the drum.

The lower heat shield 41b has a preferably driven support roller 47, which prevents sagging of the strip as it passes through the shear 20. With the heat shield 41b swung in, the support roller 47 and its drive are integrated in the roller table for the strip.

The roller table itself consists of two roller table units 42, 43, which are arranged at the inlet and outlet of the shear frame 32. A roller table unit 42, 43 of this type is designed as a swiveling roller table that is independent of the further roller table and has a central swivel bearing 48, 49. In the present embodiment is has four additional rollers, although the invention is not limited to this number.

Figure 10:
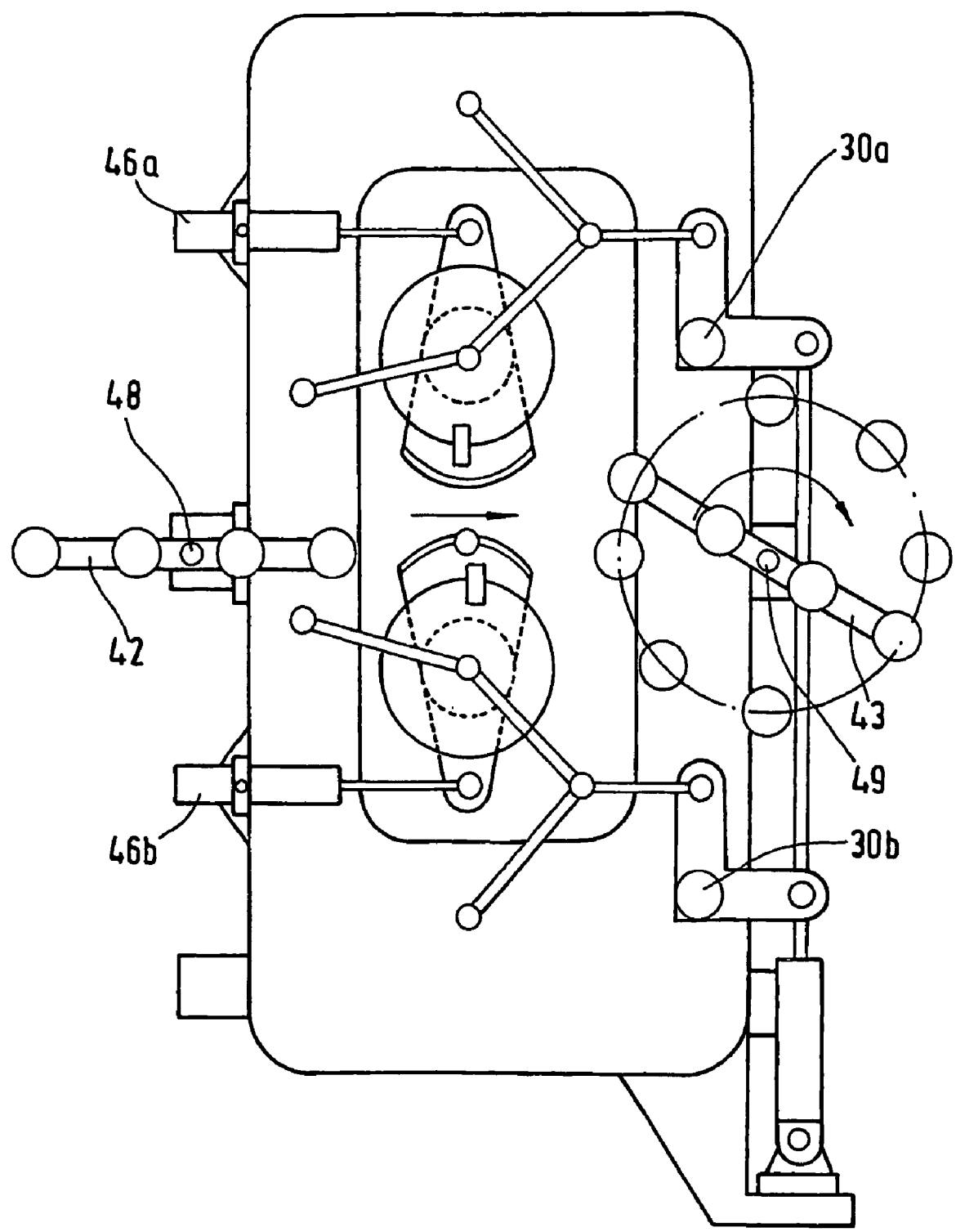
FIG. 10 shows a cropping shear with the swiveled swiveling roller table on the right side.

The manner of operation of the swiveling roller tables is explained with reference to FIGS. 9 and 10. For a strip that is being conveyed from left to right, whose end is being cropped, the swiveling roller table or the roller table unit 42, which is located after the blade drums 28a, b, is swung upward in the left direction from the horizontal in such a way that the cut crop end can fall over the swiveled roller table and out of the shearing area. The swiveling roller table is then further swiveled all the way around in the left direction until it has again arrived in the horizontal position, as indicated by the rollers 50 shown in gray, so that the following strip leading end is again supported. FIG. 10 shows the position of the swiveling roller table or roller table unit 43 during a cropping cut towards the rear (right). This is followed by a complete swiveling of the swiveling roller table, so that the following strip leading end is again supported. The use of the swiveling roller tables or roller table units 42, 43 ensures that a crop end does not interfere with the strip material that subsequently starts to pass through again but rather can be effectively removed from the roller table.

LIST OF REFERENCE NUMBERS 1 reversing stand
2 Steckel finishing stand
3 intermediate roller table
4 reel furnace
5 reel furnace
6 final unit, cooling line 6a
7 prestrip cropping shear
8 Steckel rolling stand
9 furnace reel
10 furnace reel
11 furnace shell
12 furnace shell
13 coiler
14 coiler
15 circumference of a coil
16 circumference of a coil
17 driver
18 driver
19 furnace guide
20 cropping shear
21 stand roller table (21a, b)
22 lateral guides (22a, b)
23 strip measuring device
24 toggle mechanism
25 toggle mechanism
26 toggle mechanism
27 toggle mechanism
28 blade drums (28a, b)
29 drives (29a–d)
30 synchronous shafts (30a, b)
31 bearings (31a, b)
32 shear frame
33 blade (33a, b)
34 roller table
35 piston rod
36 toggle link (36a, b)
37 lever
38 lever
39 lever
40 lever
41 heat shield (41a, b)
42 swiveling roller table unit
43 swiveling roller table unit
44 lever
45 end of the heat shield
46 separate drive unit
47 support roller
48 central swivel bearing
49 central swivel bearing

The invention claimed is:

1. Installation for hot rolling strip with a reversing Steckel rolling stand (8), on either side of which a furnace reel (9, 10) is arranged, with drivers (17, 18), which are installed between each furnace reel (9, 10) and the Steckel rolling stand (8), and with a cropping shear, wherein a single flying cropping shear (20) is installed between one driver (17) and the Steckel rolling stand (8), wherein the cropping shear (20) is a drum blade cropping shear with both an upper and lower adjustable blade drum (28a, b) for making the flying cut of the strip material, such that each blade drum (28a, b) can be adjusted between a position some distance from the strip material during the rolling operation and a cutting position, wherein a heat shield (41a, b) can be swung into the space between the strip material and the corresponding adjustable blade drum (28a, b), which has been moved into its position some distance from the strip material.

2. Installation in accordance with claim 1, wherein the lower heat shield (41b) of the lower blade drum (28b) is equipped with at least one strip support roller (47), which, when the heat shield (41b) is swung into place, prevents sagging of the strip as it passes through the shear.

3. Installation in accordance with claim 1, wherein a cooling device is provided for cooling the blade drums with a coolant, and that the upper heat shield (41a) of the upper blade drum (28a) simultaneously serves as a coolant collection channel and as protection for the strip material.

4. Installation in accordance with claim 1, wherein each swiveling heat shield (41a, b) is supported on the axis of the corresponding blade drum (28a, b).

5. Installation in accordance with claim 1, wherein the blade drums (28a, b) can be swiveled between a swung-out rolling position and an engaged cutting position by means of an upper and a lower toggle mechanism (24–27a, b).

6. Installation in accordance with claim 5, wherein the upper and lower toggle mechanisms (24–27a, b) are combined in a closed shear frame (32).

7. Installation for hot rolling strip with a reversing Steckel rolling stand (8), on either side of which a furnace reel (9, 10) is arranged, with drivers (17, 18), which are installed between each furnace reel (9, 10) and the Steckel rolling stand (8), and with a cropping shear, wherein a single flying cropping shear (20) is installed between one driver (17) and the Steckel rolling stand (8), wherein a roller table area, which is located immediately adjacent to the cropping shear (20) and serves to convey the strip material through the shear, is formed by two independently swiveling roller table units (42, 43), wherein, to allow removal of the crop end, each roller table unit (42, 43) can be swiveled out of the horizontal position in such a way that the crop end can fall freely, without hindrance by the roller table unit (42, 43), and that the roller table unit (42, 43) can then be swung further in the same swiveling direction, until it again reaches its horizontal position.

* * * * *